United States Patent
Petrocelli

(10) Patent No.: US 10,642,795 B2
(45) Date of Patent: May 5, 2020

(54) SYSTEM AND METHOD FOR EFFICIENTLY DUPLICATING DATA IN A STORAGE SYSTEM, ELIMINATING THE NEED TO READ THE SOURCE DATA OR WRITE THE TARGET DATA

(71) Applicant: Greenbytes, Inc., Ashaway, RI (US)

(72) Inventor: Robert Petrocelli, Westerly, RI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/923,417

(22) Filed: Jun. 21, 2013

(65) Prior Publication Data

US 2014/0324791 A1 Oct. 30, 2014

Related U.S. Application Data

(60) Provisional application No. 61/817,339, filed on Apr. 30, 2013.

(51) Int. Cl.
*G06F 16/174* (2019.01)

(52) U.S. Cl.
CPC ................. *G06F 16/1748* (2019.01)

(58) Field of Classification Search
CPC ........... G06F 17/30156; G06F 16/1748; G06F 16/1752
See application file for complete search history.

(56) References Cited

U.S. PATENT DOCUMENTS

| | | | | |
|---|---|---|---|---|
| 8,539,148 B1* | 9/2013 | Chen | ............. | G06F 3/0608 711/112 |
| 8,671,082 B1* | 3/2014 | Yadav | ............. | G06F 17/30156 707/692 |
| 9,043,555 B1* | 5/2015 | Khona | ............. | G06F 3/0641 711/118 |
| 9,116,848 B1* | 8/2015 | Jordan | ............. | G06F 11/1453 |
| 9,430,164 B1* | 8/2016 | Botelho | ............. | G06F 3/0655 |
| 2003/0106942 A1* | 6/2003 | Ohya | ............. | G06F 21/77 235/492 |
| 2003/0229826 A1* | 12/2003 | Lee | ............. | G06F 11/2092 714/42 |
| 2008/0034153 A1* | 2/2008 | Lee | ............. | G06F 12/0246 711/103 |
| 2009/0327626 A1* | 12/2009 | Kaushik | ............. | G06F 11/1466 711/162 |
| 2010/0070478 A1* | 3/2010 | Anglin | ............. | G06F 11/1453 707/674 |
| 2010/0094817 A1* | 4/2010 | Ben-Shaul | ............. | G06F 3/0608 707/697 |
| 2011/0202812 A1* | 8/2011 | Asano | ............. | G06F 11/1068 714/747 |
| 2012/0072644 A1* | 3/2012 | Asano | ............. | G06F 12/0246 711/103 |

(Continued)

*Primary Examiner* — Mohammad S Rostami
(74) *Attorney, Agent, or Firm* — Snell & Wilmer L.L.P.; Kent A. Lembke

(57) ABSTRACT

A method for copying data efficiently within a deduplicating storage system eliminates the need to read or write the data per se within the storage system. The copying is accomplished by creating duplicates of the metadata block pointers only. The result is a process that creates and arbitrary number of copies using minimal time and bandwidth.

8 Claims, 2 Drawing Sheets

(56) References Cited

U.S. PATENT DOCUMENTS

| | | | |
|---|---|---|---|
| 2012/0084524 A1* | 4/2012 | Gokhale | G06F 11/1415 |
| | | | 711/162 |
| 2013/0013865 A1* | 1/2013 | Venkatesh | G06F 17/30132 |
| | | | 711/133 |
| 2013/0036091 A1* | 2/2013 | Provenzano et al. | 707/624 |
| 2013/0042083 A1* | 2/2013 | Mutalik et al. | 711/162 |
| 2013/0097380 A1* | 4/2013 | Colgrove | G06F 17/30159 |
| | | | 711/118 |
| 2013/0191349 A1* | 7/2013 | Akirav | G06F 17/00 |
| | | | 707/692 |
| 2013/0226881 A1* | 8/2013 | Sharma | G06F 17/30336 |
| | | | 707/692 |
| 2013/0339407 A1* | 12/2013 | Sharpe et al. | 707/827 |
| 2014/0006363 A1* | 1/2014 | Constantinescu | G11B 27/032 |
| | | | 707/692 |
| 2014/0006465 A1* | 1/2014 | Davis | G06F 16/182 |
| | | | 707/827 |
| 2014/0181443 A1* | 6/2014 | Kottomtharayil et al. | 711/162 |
| 2014/0188805 A1* | 7/2014 | Vijayan | G06F 11/1453 |
| | | | 707/646 |
| 2014/0201161 A1* | 7/2014 | Kumarasamy et al. | 707/679 |
| 2014/0229936 A1* | 8/2014 | Gaonkar | G06F 9/45558 |
| | | | 718/1 |
| 2014/0258237 A1* | 9/2014 | Dinkar | G06F 11/1469 |
| | | | 707/645 |
| 2014/0310499 A1* | 10/2014 | Sundararaman | G06F 12/0269 |
| | | | 711/203 |
| 2016/0306853 A1* | 10/2016 | Sabaa | H04L 67/2842 |

* cited by examiner

SYSTEM AND METHOD FOR EFFICIENTLY DUPLICATING DATA IN A STORAGE SYSTEM, ELIMINATING THE NEED TO READ THE SOURCE DATA OR WRITE THE TARGET DATA

CROSS-REFERENCE TO RELATED APPLICATION

This patent document claims priority to earlier filed U.S. Provisional Patent Application Ser. No. 61/817,339, filed Apr. 30, 2013, the entire contents of which are incorporated by reference.

BACKGROUND

1. Technical Field

The present patent document relates generally to a system and method for creating one or more copies of a data-block in a data storage system.

2. Background of the Related Art

Data deduplication is a method in which only unique data is physically kept in a data storage system. The unique data is referenced by a unique "fingerprint" derived from the data often in the form of a cryptographic hash function. Deduplication methods compare the fingerprint of incoming data blocks to the fingerprints of all existing data blocks. If the incoming data block is unique it is stored, if it is not unique it is not stored but is added as a reference to the existing unique data block. When data is copied internally in a system using deduplication there is a 100% certainty that the unique fingerprint for this data is also already stored in the data storage system. However, the system must efficiently keep track of where these duplicate are.

Therefore, there is a perceived need in the industry for a method of copy data within a data deduplication system that is efficient and accurate.

SUMMARY

The present invention solves the problems of the prior art by providing a method to copy data within a data deduplication system that optimizes the space used to store information utilizing a data deduplication technique. This method relates to the process of traversing the deduplication metadata and and updating the reference counts for this data rather than reading the data to be copied and writing additional copies back to the data storage system. Eliminating the need to read and write duplicate blocks can significantly reduce the time and storage system internal bandwidth needed to accomplish a block copy.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
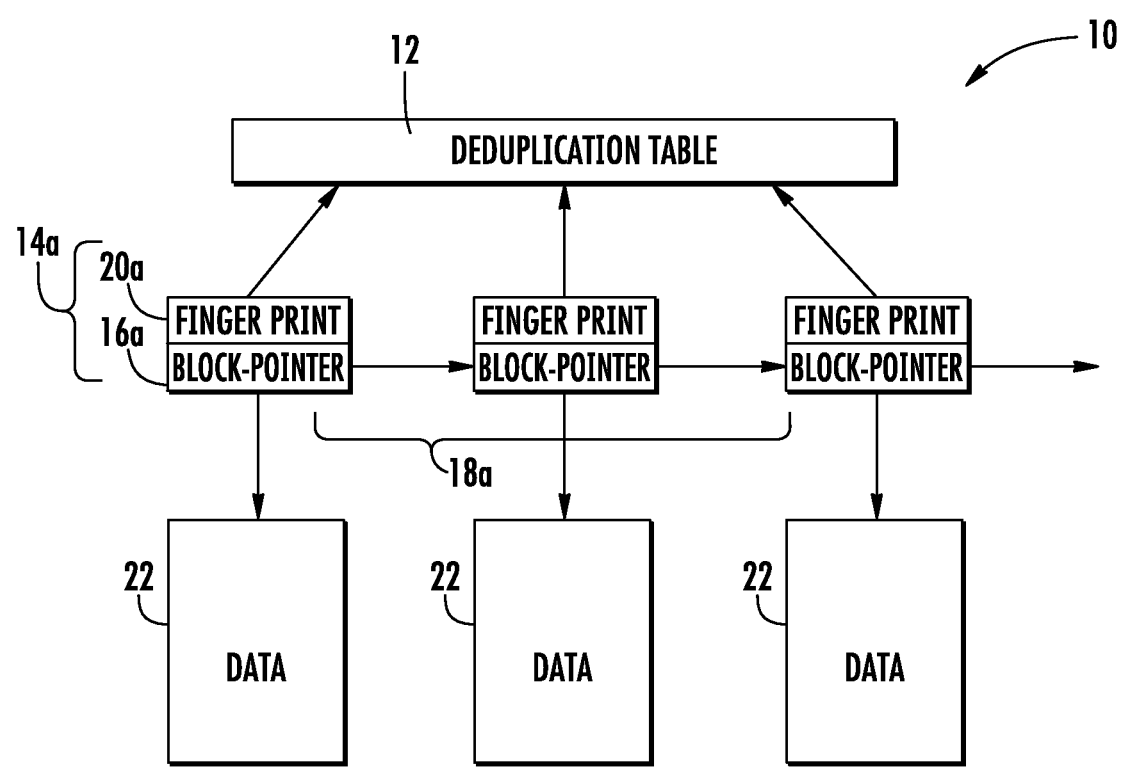
FIG. 1 shows a conceptual illustration of data within a deduplication system prior to creating a copy.

Referring to FIG. 1, a conceptual illustration of a data dedpulication system is shown generally at 10. The data dedpulication system includes a deduplication table 12, and meta data 14a including a block pointers 16a (in the aggregate forming a block pointer list 18a) and finger prints 20a of the physical data blocks 22, which will be described in more detail below.

The deduplication system includes generally one or more volumes, physical and logical. The volumes may be implemented on any number of data storage devices, such as hard disk drives and solid state storage devices. The method described herein may be implemented on dedicated hardware or on general purpose computers using off-the-shelf components. Frequently, a mix of inexpensive, replaceable mass storage devices are desirable to reduce cost and provide redundancy, combined with a dedicated controller optimized for speed and efficiency. The controller provides seamless integration with the storage devices to the end user, masking the complexity from the end user such that the deduplication system appears and operates as any other mass storage device.

It should be understood that the method and system described herein may be employed in any type of operating system. The method and system may be implemented in any type of software code using any language and can run on any type of computer hardware. This unique method may also be employed for data stored in any type of storage device, such as arrays of storage devices and any type of device, such as magnetic, solid state (such as flash) and optical media.

Each data storage device is subdivided into numerous, addressable physical blocks 22. Each physical block 22 is identified and locatable by a block pointer 16. Block pointers 16 are data structures maintained by a data storage device which relate a logical block address (the logical location of a data block) to a physical block address (the physical location of a data block) In deduplicated storage systems multiple logical blocks may be associated (point to) a common physical block.

A finger print 20a of the data block 22 is paired with the block pointer 16a for that data block 22. Together the block pointer 16a and the finger print 20a form the meta data 14a for that data block 22. After the copy operation is complete, a second set of meta data 14b, having a copy of the finger print 20b and block pointer 16b is created, pointing to the same physical block 22 (best seen in FIG. 2).

The deduplication system includes a deduplication table 12. In deduplicated storage systems it is necessary to know how many instances of a logical block 16a, 16b point to a common physical block 22. This reference count is needed when logical blocks are deleted so that the underlying physical block 22 will also be deleted when the reference count=0.

Data is often larger than a single physical block 22 address. Consequently, in order to store the data, a chain or list of block pointers 16a, 16b is created identifying the next block in the data, the sum of which form the data. This list is called the block pointer list 18a, 18b. During a standard copy operation in a data storage system, the block pointer list 18a for a file is traversed and each physical block 22 is read into system memory before being copied to a new physical block. The process of sequentially accessing block pointers 16a independent of reading or writing the associated physical blocks 22 is called metadata traversal.

Figure 2:
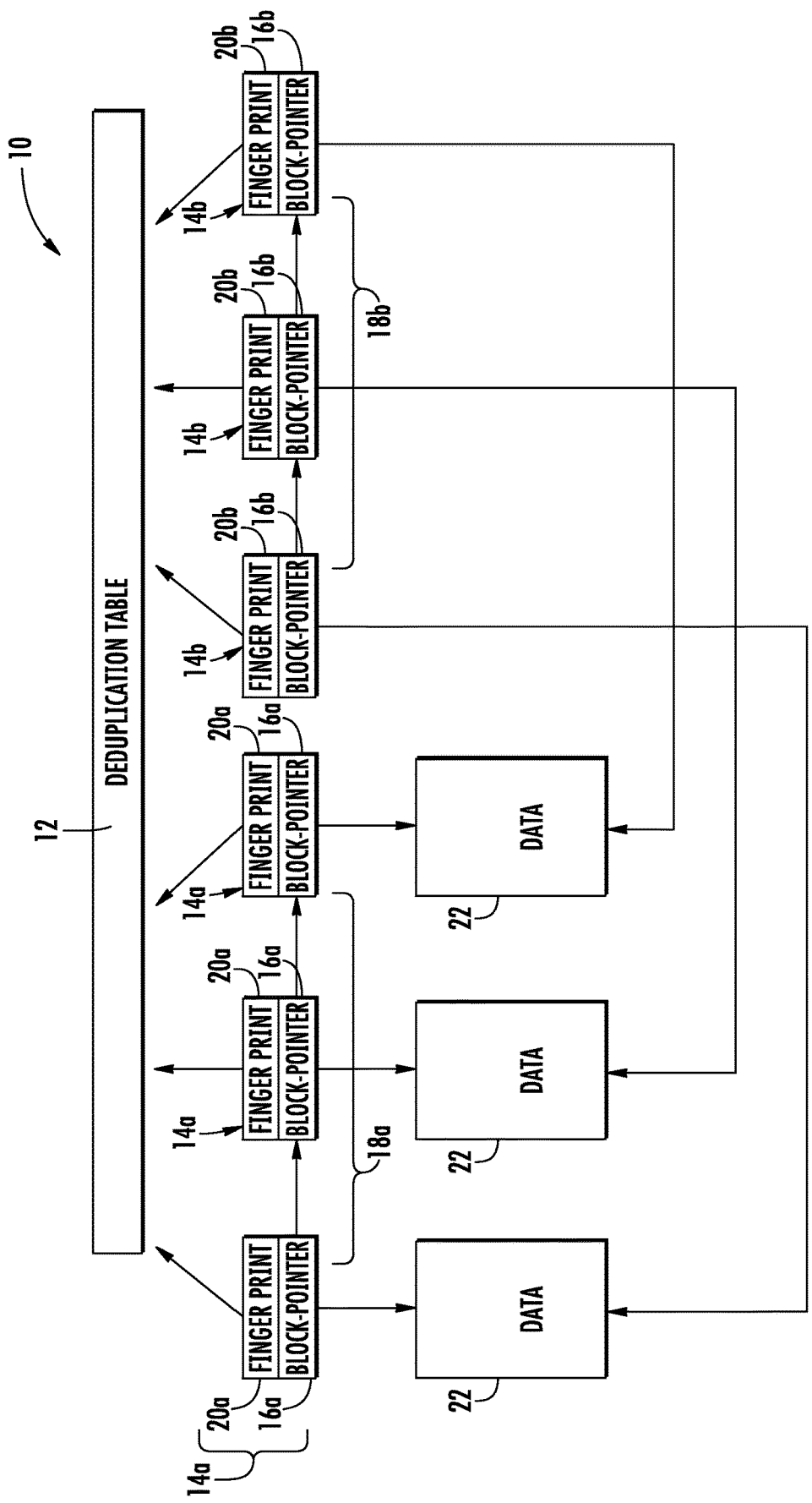
FIG. 2 shows a conceptual illustration of data within a deduplication system after a copy of the data has been made, by creating copies of the metadata, i.e. logical block pointers and finger prints only.

Referring to FIG. 2, a conceptual illustration showing data duplicated within a data deduplication system is shown generally. The method generally includes of the steps of traversing the meta data via the logical block pointers 16a, and creating new logical block pointers 16b, which are associated with a copy of the data blocks 22. The reference counts for the physical blocks 22 referenced in the deduplication table 12 are incremented to protect the integrity of the underlying physical block 22.

The copy operation does not need to copy an entire datafile, but can form a subset of physical blocks 22. In this case, the method includes the steps of traversing the logical block pointers 16*a* of a range of blocks within a datafile and creating new logical block pointers 16*b*, which are associated with a second range of blocks 22 within the datafile. The reference counts for the physical blocks 22 referenced in the deduplication table are incremented to protect the integrity of the underlying physical blocks 22 as well.

Therefore, it can be seen that a novel method of creating a copy of data within a data deduplication system is disclosed, which has increased efficiency and throughput because it does not read the underlying data block and write it back to the data deduplication system. Rather by making a direct copy of the meta data, only, and incrementing the reference counts in the deduplication table, significant resources of time and bandwidth may be achieved.

It would be appreciated by those skilled in the art that various changes and modifications can be made to the illustrated embodiments without departing from the spirit of the present invention. All such modifications and changes are intended to be within the scope of the present invention.

What is claimed is:

1. A method of making a copy of data having metadata in a data deduplication system, comprising:
   identifying a physical data block in the deduplication system, the physical data block having stored therein data to be copied as part of a copy operation;
   without reading the physical data block by the deduplication system, reading metadata associated with the identified physical data block, the metadata including both a fingerprint of the data and a first logical block pointer that relates a first logical block address of the physical data block to a physical block address of the physical data block;
   without reading the physical data block by the deduplication system, creating a logical copy of the metadata by copying the metadata to include a copy of the fingerprint and a second logical block pointer that relates a second logical block address of the physical data block to the physical block address of the physical data block; and
   without reading the physical data block by the deduplication system, incrementing a reference count of the physical data block, wherein the reference count indicates the number of instances of logical data blocks that point to the physical data block, the reference count stored in a deduplication table of the deduplication system so as to protect integrity of the physical data block.

2. The method of claim 1, wherein the data is at least a portion of a data file.

3. The method of claim 1, wherein the physical data block is one of a range of blocks within a data file.

4. The method of claim 1, wherein the reading comprises traversing the metadata sequentially.

5. The method of claim 1, wherein the fingerprint is derived from the physical data block via a cryptographic hash function.

6. The method of claim 1, wherein the creating is performed without writing the physical data block.

7. A method of making a copy of data having metadata in a data deduplication system, comprising:
   identifying a physical data block in the deduplication system, the physical data block having stored therein data to be copied as part of a copy operation;
   reading metadata associated with the identified physical data block, the metadata including both a fingerprint of the data and a first logical block pointer that relates a first logical block address of the physical data block to a physical block address of the physical data block;
   without reading the physical data block by the deduplication system, creating a logical copy of the metadata by copying the metadata to include a copy of the fingerprint and a second logical block pointer that relates a second logical block address of the physical data block to the physical block address of the physical data block; and
   incrementing a reference count of the physical data block,
   wherein the reference count indicates the number of instances of logical data blocks that point to the physical data block, the reference count stored in a deduplication table of the deduplication system so as to protect integrity of the physical data block, and
   wherein the physical data block is one of a range of blocks within a data file, whereby a subset of the data file is generated by the method.

8. A method of making a copy of data having metadata in a data deduplication system, comprising:
   identifying a physical data block in the deduplication system, the physical data block having stored therein data to be copied as part of a copy operation;
   reading metadata associated with the identified physical data block, the metadata including both a fingerprint of the data and a first logical block pointer that relates a first logical block address of the physical data block to a physical block address of the physical data block;
   without reading the physical data block by the deduplication system, creating a logical copy of the metadata by copying the metadata to include a copy of the fingerprint and a second logical block pointer that relates a second logical block address of the physical data block to the physical block address of the physical data block; and
   incrementing a reference count of the physical data block,
   wherein the reference count indicates the number of instances of logical data blocks that point to the physical data block, the reference count stored in a deduplication table of the deduplication system so as to protect integrity of the physical data block, and
   wherein the creating is performed without writing the physical data block.

\* \* \* \* \*

UNITED STATES PATENT AND TRADEMARK OFFICE
CERTIFICATE OF CORRECTION

PATENT NO. : 10,642,795 B2  
APPLICATION NO. : 13/923417  
DATED : May 5, 2020  
INVENTOR(S) : Petrocelli Page 1 of 1

It is certified that error appears in the above-identified patent and that said Letters Patent is hereby corrected as shown below:

In the Specification

In Column 1, Line 43, delete "and and" and insert -- and --, therefor.

In Column 1, Line 67, delete "dedpulication" and insert -- deduplication --, therefor.

In Column 2, Line 1, delete "dedpulication" and insert -- deduplication --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*